US010947161B2

United States Patent
Sato et al.

(10) Patent No.: US 10,947,161 B2
(45) Date of Patent: *Mar. 16, 2021

(54) "MXENE" PARTICULATE MATERIAL, PRODUCTION PROCESS FOR THE SAME AND SECONDARY BATTERY

(71) Applicant: ADMATECHS CO., LTD., Miyoshi (JP)

(72) Inventors: Kimitoshi Sato, Miyoshi (JP); Yusuke Watanabe, Miyoshi (JP); Nobutaka Tomita, Miyoshi (JP); Akihiko Suda, Nagakute (JP); Tatsuo Fukano, Nagakute (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,161

(22) Filed: Mar. 18, 2020

(65) Prior Publication Data
US 2020/0255343 A1 Aug. 13, 2020

Related U.S. Application Data

(63) Continuation of application No. PCT/JP2018/048449, filed on Dec. 28, 2018.

(51) Int. Cl.
*C04B 35/56* (2006.01)
*H01M 10/0525* (2010.01)
(Continued)

(52) U.S. Cl.
CPC ...... *C04B 35/5618* (2013.01); *C04B 35/6261* (2013.01); *C04B 35/62625* (2013.01);
(Continued)

(58) Field of Classification Search
CPC .................. C04B 35/5618; H01M 4/1393
See application file for complete search history.

(56) References Cited

U.S. PATENT DOCUMENTS 10,573,768 B2 *  2/2020  Ghidiu ............... H01L 33/42
2013/0052438 A1  2/2013  Hu et al.
(Continued)

FOREIGN PATENT DOCUMENTS

CN   104056591 A   9/2014
CN   108615871 A   10/2018
(Continued)

OTHER PUBLICATIONS

Korean Office Action dated Apr. 13, 2020 in Korean Patent Application No. 10-2019-7034392 (with unedited computer generated English translation), citing documents AA, AX and AY therein, 15 pages.

(Continued)

*Primary Examiner* — Karl E Group
(74) *Attorney, Agent, or Firm* — Oblon, McClelland, Maier & Neustadt, L.L.P.

(57) ABSTRACT

A particulate material with a composition expressed by $Ti_2Al_x(C_{(1-y)}N_y)_z$ (where "x" is more than 0.02, "y" is $0<"y"<1.0$, and "z" is from 0.8 to 1.20), the particulate material comprising layers including gap layers providing an interlayer distance of from 0.59 nm to 0.70 nm within a crystal lattice; and/or with another composition expressed by $Ti_3Al_x(C_{(1-y)}N_y)_z$ (where "x" is more than 0.02, "y" is $0<"y"<1.0$, and "z" is from 1.80 to 2.60), the particulate material comprising layers including gap layers providing an interlayer distance of from 0.44 nm to 0.55 nm within a crystal lattice.

13 Claims, 7 Drawing Sheets

(51) Int. Cl.
*H01M 4/583* (2010.01)
*C04B 35/626* (2006.01)
*H01M 4/02* (2006.01)

(52) U.S. Cl.
CPC ....... *H01M 4/583* (2013.01); *H01M 10/0525* (2013.01); *C04B 2235/3843* (2013.01); *C04B 2235/5445* (2013.01); *C04B 2235/5454* (2013.01); *C04B 2235/77* (2013.01); *H01M 2004/027* (2013.01)

(56) References Cited

U.S. PATENT DOCUMENTS

| | | |
|---|---|---|
| 2014/0162130 A1 | 6/2014 | Barsoum et al. |
| 2017/0088429 A1 | 3/2017 | Shin et al. |
| 2017/0294546 A1 | 10/2017 | Ghidiu et al. |

FOREIGN PATENT DOCUMENTS

| | | |
|---|---|---|
| CN | 108811478 A | 11/2018 |
| CN | 108987674 A | 12/2018 |
| JP | H11-279745 A | 10/1999 |
| JP | 2016-063171 A | 4/2016 |
| JP | 2017-076739 A | 4/2017 |
| WO | WO 2011/136136 A1 | 11/2011 |

OTHER PUBLICATIONS

Naguib, M., et al., "Two-Dimensional Transition Metal Carbides", ACS Nano. 2012, vol. 6. No. 2, pp. 1322-1331.

Barsoum, M.W., et al., "Processing and characterization of $Ti_2AlC$, $Ti_2AlN$, and $Ti_2AlC_{0.5}N_{0.5}$", Metallurgical and Materials Transactions A, 2000. vol. 31, Issue 7, pp. 1857-1865.

International Search report dated Mar. 12, 2019, in PCT/JP2018/048449, filed Dec. 28, 2018 (with English Translation).

Written Opinion of International Search Report dated Mar. 12, 2019 in PCT/JP2018/048449 (with English Translation).

Notification of Reasons for Refusal dated Jun. 11, 2019, in Japanese Patent Application No. 2019-522353 (w/ Computer-generated English translation).

Decision to Grant dated Jul. 18, 2019, in Japanese Patent Application No. 2019-522353 (w/ Computer-generated English translation).

Combined Chinese Office Action and Search Report dated Jun. 10, 2020 Chinese Patent Application No. 201880027612.6 (with unedited computer generated English translation and English translation of Category of Cited Documents), citing documents AO through AR and AX therein, 18 pages.

Presser, V., et al. "First-order Raman scattering of the MAX phases: $Ti_2AlN$, $Ti_2AlC_{0.5}N_{0.5}$, $Ti_2AlC$, $(Ti_{0.5}V_{0.5})_2AlC$, $V_2AlC$, $Ti_3AlC_2$, and $Ti_3GeC_2$", Journal of Raman Spectroscopy, Jun. 2011. vol. 43, Issue 1, pp. 168-172.

Combined Chinese Office Action and Search Report dated Oct. 12, 2020 in Chinese Patent Application No. 201880027612.6 (with unedited computer generated English translation and English translation of category of Cited Documents), citing document AX therein, 15 pages.

"Preparation and Characterization of Novel Functional Materials", edited by Qiang Liang-sheng, *Harbin Institute of Technology Press*, $1^{st}$ edition, 5.2 graphene preparation technique, Jun. 2017, pp. 148-156 with cover pages (with unedited computer generated English translation).

* cited by examiner

"MXENE" PARTICULATE MATERIAL, PRODUCTION PROCESS FOR THE SAME AND SECONDARY BATTERY

CROSS REFERENCE TO RELATED APPLICATIONS

The present application is a Continuation Application of International Application No. PCT/JP2018/048449, filed on Dec. 28, 2018, the entire contents of which are incorporated herein by reference.

BACKGROUND OF THE INVENTION

1. Field of the Invention

The present invention relates to a particulate material and a production process for the same, as well as a secondary battery.

2. Description of the Related Art

Conventionally, a particulate material comprising an "MXene" intercalation compound, which is obtained by removing Al from an "MAX"-phase ceramic powder, such as $Ti_3AlC_2$ and $Ti_2AlC$, a few of intercalation compounds, by means of an acidic treatment, has been known (see Japanese Unexamined Patent Publication (KOKAI) Gazette No. 2016-63171, Japanese Patent Publication (KOKAI) Gazette No. 2017-76739, United States Laid-open Patent Publication No. 2017/0294546, and United States Laid-open Patent Publication No. 2017/0088429). The particulate material will be hereinafter referred to as an "'MXene' particulate material" whenever appropriate, or will be simply referred to as a "particulate material."

It has been expected to apply the "MXene" intercalation compounds to an ingredient for negative-electrode active material for secondary battery (or storage battery), because they are able to store/eliminate sodium ions or lithium ions in the gap layers from which the aluminum layers are removed.

The "MXene" intercalation compounds exhibit such a large interlayer distance as 0.4 nm or more between the gap layers. Consequently, it has been expected to apply them to sodium-ion secondary batteries, because sodium ion has a large ionic radius than that of lithium ion. Moreover, it has been believed that Ti2-layered "MXene" particulate materials are more promising than Ti3-layered "MXene" particulate materials, because the former is better than the latter in battery characteristics, such as capacities.

"MAX"-phase ceramics are intercalation compounds whose general formula is expressed by $M_{n+1}AX_n$. The formula is configured as follows: "M" is a transition metal, such as Ti, Sc, Cr, Zr or Nb; "A" is an "A"-group element, such as Al, Si, Ga or Ge; "X" is carbon (C) or $C_{(1.0-x)}N_x$ (where $0<$"x"$\leq1.0$); and "n" is from one to three.

When one of the intercalation compounds with the general formula whose "A" is configured as aluminum (Al), the Al layers are removed selectively by an acidic treatment, because the bonding of "M"-"A" or "A"-"X" is weaker than the bonding of "M"-"X." It has been tried to utilize the "MAX"-phase ceramics for an ingredient for negative-electrode active material for secondary battery by immersing them in an HF aqueous solution, or an (LiF+HCl) aqueous solution or (KF+HCl) aqueous solution, whose temperature is from 35° C. to 45° C., for 15 to 30 hours, thereby dissolving the Al layers completely. The dissolved Al layers make gap layers to which functional groups, such as an OH group and halogen groups, are adsorbed to widen the interlayer distance to 0.4 nm or more between the gap layers.

Graphite, which has been employed for a negative-electrode active material for lithium-ion secondary battery, helps lithium-ion secondary batteries show good battery characteristics, because it has an interlayer distance of about 0.3 nm that allows lithium ions with an ionic diameter of about 0.152 nm to readily intrude between the layers. However, sodium ions are less likely to go into the conventionally employed graphite, because they have such a large ionic diameter of about 0.204 nm that makes the interlayer distance in graphite relatively smaller for sodium ions. Therefore, sodium-ion secondary batteries using graphite are extremely inferior to lithium-ion secondary batteries using the same in battery characteristic.

In particular, Ti2-layered "MXene" with a wide interlayer distance is optimum for sodium-ion secondary battery. Moreover, a Ti2-layered "MXene" particulate material, whose interlayer distance is much wider between the gap layers, has been believed to be promising, because it allows the storage/elimination of ions whose ionic diameter is larger than that of lithium ion.

Moreover, it has been reported that the production of an "MXene" particulate material having a flaky form in which exfoliation has been developed between the layers is made possible by irradiating a water-washed deposit (or "MXene" clay) with ultrasonic waves after substituting an alcohol, such as ethanol, for washing water, and then collecting the resultant clear supernatant liquid. It has been tried to utilize the resulting "MXene" particulate material for an ingredient for negative-electrode active material for secondary battery.

When making use of the "MXene" particulate material as a negative-electrode active material for secondary battery, an "MXene" particle material using $Ti_2AlC$ as an "MAX"-phase ceramic powder comprises layers whose thickness is smaller than that of layers constituted of another "MXene" particle material using $Ti_3AlC_2$ as an "MAX"-phase ceramic powder, thereby enabling a per-unit-mass capacity for taking in metals between the layers to enlarge by the diminished thickness. However, upon subjecting a starting raw material to a solid-phase reaction in order to obtain a $Ti_2AlC$ powder, raising a calcination temperature to 1,300° C. or more in an inert atmosphere results in decomposing $Ti_2AlC$ crystal phase to form $Ti_3AlC_2$ crystal phase in a large amount, although unreacted substances and intermediate products, such as Ti/Al alloys, $Ti_3AlC$ and TiC, disappear.

On the contrary, lowering the calcination temperature down to 1,300° C. or less results in posing such a problem that unreacted substances and intermediate products, such as Ti/Al alloys, $Ti_3AlC$ and TiC, have remained in a large amount, although only $Ti_2AlC$ phase is formed in such a condition as no $Ti_3AlC_2$ crystal phase is present. Moreover, a method of increasing the Ti and Al amounts in the starting raw material more than their theoretical amounts has been proposed as a technique for obtaining $Ti_2AlC$ with much higher purity. However, our investigation revealed that the method had left over problems, because no Ti2-layered "MAX"-phase ceramics with sufficiently high purity were produced.

In addition, when using an "MXene" particulate material for a negative-electrode active material for secondary battery, it is essential from the viewpoint of processing to exfoliate the "MXene" particulate material uniformly and disperse it highly in an organic solvent to prepare a slurry. According to related art, the exfoliation has been carried out by ultrasonic irradiation after subjecting a $Ti_3AlC_2$ or Ti$_2$AlC powder to an acidic treatment to completely remove the Al layers and then substituting an organic solvent for acid and water used in the acidic treatment.

Moreover, according to another related art, the Ti$_3$AlC$_2$ or Ti$_2$AlC powder has been immersed in a HF aqueous solution, or in a (fluoride salt+hydrochloric acid) mixture warmed at from 35° C. to 45° C. for from 15 hours to 30 hours. Investigations by the present inventors found that the conventional immersion allows removing the Al layers completely and permits exfoliating the powder up to a few layers in a unit cell. Meanwhile, however, the powder was found to be oxidized in some of the surface. Another dedicated investigation by the present inventors found that the production of an "MXene" particulate material virtually free of any oxidation in the surface is made possible by immersing the Ti$_3$AlC$_2$ or Ti$_2$AlC powder in a (fluoride salt+hydrochloric acid) aqueous solution with a temperature of from 20° C. to 30° C. for from 12 hours to 30 hours, although some of the Al layers remain. The produced "MXene" particulate material, however, was associated with such a problem that it could hardly be exfoliated by conventional exfoliation methods like the ultrasonic irradiation.

SUMMARY OF THE INVENTION

The present invention has been completed in view of the aforementioned circumstances. It is therefore an object of the present invention to provide an "MXene" particulate material derived from Ti2 layer, "MXene" particulate material which is applicable to a negative-electrode active material for secondary battery, whose interlayer distance is wide between the gap layers and which makes a flaky intercalation compound; a Ti2-layered "MAX"-phase ceramic particulate material which are of high purity required upon making the "MXene" particulate material; an "MXene" particulate material derived from Ti3 layer; and a production process for the two "MXene" particulate materials derived from Ti2 layer and Ti3 layer respectively, and that for the Ti2-layered "MAX"-phase ceramic particulate material; as well as a secondary battery.

The inventors of the present invention investigated wholeheartedly for the purpose of achieving the aforementioned object, and obtained the following knowledge. That is, they made a Ti2-layered "MAX"-phase ceramic powder of high purity by substituting nitrogen for some of the carbon sites in Ti$_2$AlC, or produced an "MXene" particulate material, whose interlayer distance is much greater between the gap layers, which has a predetermined composition and which exhibits a predetermined thickness and size, by substituting nitrogen for some of the carbon sites in Ti$_3$AlC$_2$ and adjusting the production conditions, and thereby discovered that it is possible to provide a particulate material that is suitable for a negative-electrode active material for secondary battery capable of readily storing/eliminating sodium ions and lithium ions.

When applying an "MXene" particulate material, one of intercalation compounds, to a negative-electrode active material, it is necessary to turn its shape from the powdery body into a flaky powdery/particulate body. If such is the case, the intercalation compound has a large interlayer distance that is formed between the gap layers crystal-structurally when its Al layers are removed. Thus, the resulting "MXene" particulate material comes to be provided with electric characteristics allowing its application to an ingredient for negative-electrode active material for secondary battery, as disclosed in Japanese Unexamined Patent Publication (KOKAI) Gazette No. 2016-63171, Japanese Patent Publication (KOKAI) Gazette No. 2017-76739, United States Laid-open Patent Application No. 2017/0294546, and United States Laid-open Patent Application No. 2017/0088429.

According to related art, upon synthesizing a Ti$_2$AlC powder, increasing the amounts of Ti powder and Al powder more than their theoretical amounts in a starting raw material provided the Ti$_2$AlC powder with a much higher purity than that when the amounts were set at the theoretical amounts, as disclosed in Japanese Patent Publication (KOKAI) Gazette No. 2017-76739. The present inventors investigated a method for producing a Ti2-layered "MAX"-phase ceramic powder provided with a much higher purity than that provided by the conventional technique. As a result, the present inventors made a high-purity Ti2-layered "MAX"-phase ceramic powder successfully by substituting nitrogen for some of the carbon sites in Ti$_2$AlC.

Moreover, related art has been employed a method of irradiating a powdery "MXene" intercalation compound with ultrasonic waves in a liquid as a method of turning the powdery "MXene" intercalation compound into a flaky intercalation compound by exfoliating the powdery "MXene" intercalation compound, as disclosed in United States Laid-open Patent Application No. 2017/0294546. The ultrasonic irradiation collides the constituents of an intercalation compound powder with each other, thereby allowing the intercalation compound to be exfoliated extremely thinly. Then, a method like centrifugal separation permits one to take out a flaky powdery/particulate body. Employing a general pulverizing operation as a production process for flaky powdery/particulate body did not allow flaky fragments to be exfoliated from a powdery intercalation-compound, but had only produced powdery intercalation-compound particles whose particulate diameter was made smaller down to just about 1 μm.

A particulate material according to the present invention achieving the aforementioned object satisfies at least one of following (1) and (2).

(1) A particulate material with a composition expressed by Ti$_2$Al$_x$(C$_{(1-y)}$N$_y$)$_z$ (where "x" is more than 0.02, "y" is 0<"y"<1.0, and "z" is from 0.8 to 1.20), the particulate material comprising layers including gap layers providing an interlayer distance of from 0.59 nm to 0.70 nm within a crystal lattice.

(2) A particulate material with a composition expressed by Ti$_3$Al$_x$(C$_{(1-y)}$N$_y$)$_z$ (where "x" is more than 0.02, "y" is 0<"y"<1.0, and "z" is from 1.80 to 2.60), the particulate material comprising layers including gap layers providing an interlayer distance of from 0.44 nm to 0.55 nm within a crystal lattice.

(3) The particulate materials disclosed in (1) and (2) are allowed to have thicknesses whose average value is from 3.5 nm or more to 20 nm or less, and sizes, [{(longer sides)+(shorter sides)}/2], whose average value is from 50 nm or more to 300 nm or less.

(4) A to-be-given particulate material capable of making a raw material for the particulate materials according to aforementioned (1) through (3) involves a particulate material whose major component has a composition expressed by at least one of Ti$_2$AlC$_{(1-x)}$N$_x$ (where 0<"x"<1) and Ti$_3$Al(C$_{(1-x)}$N$_x$)$_2$ (where 0<"x"<1), wherein:

based on a first peak intensity "A" which a (002) plane in Ti$_2$Al(C$_{(1-x)}$N$_x$) (where 0<"x"<1) exhibits in an X-ray diffraction test;

a (002) plane in Ti$_3$Al(C$_{(1-x)}$N$_x$)$_2$ (where 0<"x"<1) exhibits a second peak intensity "B" wherein a ratio of the second peak intensity "B" to the first peak intensity "A" ("B"/"A")

is from 0.03 or more to 0.07 or less; and a crystal phase other than $Ti_2AlC_{(1-x)}N_x$ (where $0<"x"<1$) and $Ti_3Al(C_{(1-x)}N_x)_2$ (where $0<"x"<1$) exhibits a third peak intensity "C" wherein a ratio of the third peak intensity "C" to the first peak intensity "A" ("C"/"A") is 0.10 or less.

(5) A to-be-disclosed process for producing one of the particulate materials according to above-described (1) through (3) involves a production process for particulate material, the production process comprising:

a pretreatment step of removing some of contained aluminum (Al) elements from the particulate material according to above-disclosed (4) by reacting the particulate material with an acidic substance, which is composed of a combination of a fluoride salt and hydrochloric acid, at an aqueous-solution temperature of from 20° C. to 30° C., thereby producing a raw material; and a production step of producing from the raw material the particulate material according to any one of aforementioned (1) through (3).

(6) Another to-be-disclosed production process involves a production process for particulate material, the production process comprising:

a pretreatment step of removing some of contained aluminum (Al) elements from an "MAX"-phase ceramic powder by reacting the "MAX"-phase ceramic powder with an acidic substance, which is composed of a combination of a fluoride salt and hydrochloric acid, at an aqueous-solution temperature of from 20° C. to 30° C., thereby producing a raw material; and a production step of producing either one of the following:

a) a first particulate material involving particles with a composition expressed by $Ti_2Al_x(C_{(1-y)}N_y)_z$ (where "x" is more than 0.02, "y" is $0<"y"<1.0$, and "z" is from 0.8 to 1.20), the particles comprising layers including gap layers providing an interlayer distance of from 0.59 nm to 0.70 nm within a crystal lattice; and b) a second particulate material involving particles with a composition expressed by $Ti_3Al_x(C_{(1-y)}N_y)_z$ (where "x" is more than 0.02, "y" is $0<"y"<1.0$, and "z" is from 1.80 to 2.60), the particles comprising layers including gap layers providing an interlayer distance of from 0.44 nm to 0.55 nm within a crystal lattice.

(7) A to-be-disclosed secondary battery involves a negative-electrode active material comprising the particulate material according to any one of above-described (1) through (3).

A particulate material according to the present invention allows making a high-purity Ti2-layered "MAX"-phase ceramic powder by substituting nitrogen for some of the carbon sites within a unit lattice in a $Ti_2AlC$ crystal. Subjecting the Ti2-layered "MAX" phase ceramic powder to an acidic treatment permits the production of a Ti2-layered "MXene" particulate material with a much larger interlayer distance between the gap layers. Moreover, substituting nitrogen for some of the carbon sites within a unit lattice in a $Ti_3AlC_2$ crystal, and then subjecting the $Ti_3AlC_2$ crystal undergone the substitution to an acidic treatment allow the production of a Ti3-layered "MXene" particulate material with a much larger interlayer distance between the gap layers. Moreover, turning the Ti2-layered or Ti3-layered "MXene" particulate material into a flaky particulate material with predetermined sizes and thicknesses leads to removing the Al layers. The removal of the Al layers results in providing the flaky particulate material with gap layers giving a larger interlayer distance. The resultant flaky particulate material serves effectively as a negative-electrode active material for secondary battery.

In addition, a production process according to the present invention substitutes nitrogen for some of the carbon sites in a $Ti_2AlC$ crystal lattice, thereby allowing the production of a high-purity Ti2-layered "MAX"-phase ceramic powder, namely, $Ti_2AlC_{1-x}N_x$ (where $0<"x"<1$) specifically. Moreover, subjecting a particulate material, which is made by substituting nitrogen for some of the carbon sites in a $Ti_2AlC$ or $Ti_3AlC_2$ crystal lattice, to the acidic treatment, and thereafter subjecting the particulate material to bead milling using beads with selected sizes enable one to flakily exfoliate the particulate material effectively. The exfoliation by ultrasonic irradiation, which has been carried out conventionally, exfoliates just a small portion of particulate materials only, and accordingly makes centrifugal separation essentially necessary for taking out exfoliated fragments by classification. However, the present production process enables one to produce a Ti2-layered or Ti3-layered "MXene" particulate material containing many exfoliated particles, because it exfoliates the Ti2-layered or Ti3-layered "MXene" particulate material in a large amount.

DESCRIPTION OF THE EMBODIMENTS

Figure 1:
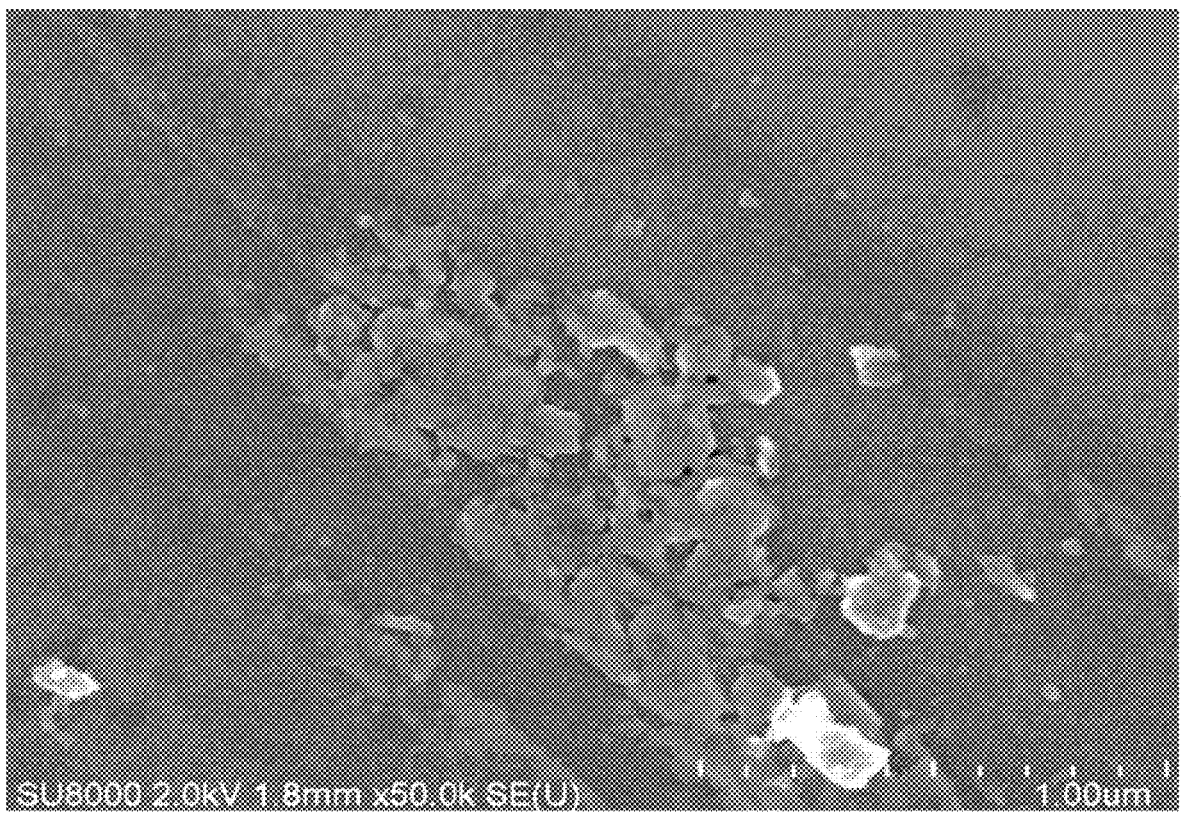
FIG. 1 is an SEM image showing how a particulate material according to First Example was exfoliated.

A particulate material according to the present invention, and a production process for the same, as well as a secondary battery according to the present invention will be hereinafter described in detail based on an embodiment. A particulate material according to the present embodiment is applicable to a material for negative-electrode active material for secondary battery, such as lithium-ion secondary batteries, sodium-ion secondary batteries and capacitors, because it provides a large interlayer distance between gap layers formed by removing the Al layers partially or completely. In order to apply the present particulate material to a material for negative-electrode active material, it is turned into flaky particles comprising gap layers providing a much larger interlayer distance by subjecting a high-purity Ti2-layered or Ti3-layered "MAX"-phase ceramic powder, which is prepared by substituting nitrogen for some of the carbon sites in $Ti_2AlCl$ or $Ti_3AlC_2$, to an acidic treatment, namely, dissolving the Al layers partially, and then exfoliating the "MAX"-phase ceramic powder flakily. Exfoliating the present particulate material, one of powdery intercalation compounds, leads to making a flaky Ti2-layered or Ti3-layered "MXene" particulate material available.

Particulate Material

A Ti2-layered or Ti3-layered "MXene" particulate material according to an embodiment comprises an intercalation compound with a predetermined compositional formula. An acidic treatment removes some of the Al layers to provide the intercalation compound with a large interlayer distance between the gap layers. A Ti2 layer is better than a Ti3 layer from the view point of battery characteristics, such as battery capacities.

Substituting nitrogen for some of the carbon sites in a $Ti_2AlC$ crystal lattice provides the Ti2 layer with gap layers between which an interlayer distance broadens from 0.59 nm and up to 0.70 nm after an acidic treatment. The predetermined compositional formula involves a composition expressed by $Ti_2Al_x(C_{(1-y)}N_y)_z$ (wherein "x" is more than 0.02, "y" is 0<"y"<1.0, and "z" is from 0.80 to 1.20).

Substituting nitrogen for some of the carbon sites in a $Ti_3AlC_2$ crystal lattice provides the Ti3 layer with gap layers between which an interlayer distance broadens from 0.44 nm and up to 0.55 nm after an acidic treatment. The predetermined compositional formula involves a composition expressed by $Ti_3Al_x(C_{(1-y)}N_y)_z$ (wherein "x" is more than 0.02, "y" is 0<"y"<1.0, and "z" is from 1.80 to 2.60).

Moreover, the present particulate material can further comprise an O group, an OH group or a halogen group, which serves as a superficial functional group, in addition to the Ti, Al, C and N elements. Interlayers broaden in the present particulate material after the Al layers are removed, because the O group, OH group or halogen group adsorbs onto the superficial layer of the present particulate material, or onto the gap layers from which the Al layers are removed by an acidic treatment, specifically, layers in which the Al element exists. Although $Ti_2Al_xC_z$ (where "x" is more than 0.02, and "z" is from 0.80 to 1.20), which makes the Ti2 layer, exhibits an interlayer distance of 0.58 nm between the gap layers after an acidic treatment, the interlayer distance is further broadened from 0.59 nm and up to 0.70 nm by substituting nitrogen for the carbon so as to be $Ti_2Al_x(C_{(1-y)}N_y)_z$ (where "x" is more than 0.02, "y" is 0<"y"<1, and "z" is from 0.80 to 1.20).

Likewise, although $Ti_3Al_xC_z$ (where "x" is more than 0.02, and "z" is from 1.80 to 2.60), which makes the Ti3 layer, exhibits an interlayer distance of 0.43 nm between the gap layers after an acidic treatment, the interlayer distance is further broadened from 0.44 nm and up to 0.55 nm by substituting nitrogen for the carbon so as to be $Ti_3Al_x(C_{(1-y)}N_y)_z$ (where "x" is more than 0.02, "y" is 0<"y" <1, and "z" is from 1.80 to 2.60).

The reason why the interlayer distance broadens has not been clarified yet. However, a possible explanation is that substituting nitrogen for some of the carbon sites in an "MAX" phase made of $Ti_2AlC$ or $Ti_3AlC_2$ weakens bonding forces so that interatomic distances enlarge, and consequently enlarges the interlayer distance.

The value "x" is more than 0.02. An employable lower limit for "x" involves 0.03, or 0.04; and an employable upper limit for "x" involves 0.58, or 0.56. The value "y" is more than 0 and less than 1. The value "y" is preferably less than 0.6, and is more preferably more than 0.4. The value "z" for the Ti2 layer preferably falls in 0.80<"z"<1.20, or more preferably falls in 0.80<"z"<0.95.

The value "z" for the Ti3 layer preferably falls in 1.80<"z"<2.60, or more preferably falls in 1.80<"z"<1.90. It is possible to employ each of the lower limits and upper limits presented for the values "x," "y" and "z" while combining them at one's discretion.

The Ti2 layer comprises the gap layers providing an interlayer distance of from 0.59 nm to 0.70 nm, or preferably from 0.63 nm to 0.70 nm. The Ti3 layer comprises the gap layers providing an interlayer distance of from 0.44 nm to 0.55 nm, or preferably from 0.51 nm to 0.55 nm.

The particulate material according to the present embodiment has such a configuration as plate shapes, leaf shapes or flaky shapes. When dimensions in the lamination direction of the layers in an intercalation compound are labeled "thicknesses" and the maximum and minimum values of dimensions in a direction perpendicular to the "thicknesses" are labeled "longer sides" and "shorter sides" respectively, the present particulate material has an average value of from 50 nm or more to 300 nm or less in sizes (i.e., ("longer sides"+"shorter sides")/2), and another average value of from 3.5 nm or more to 20 nm or less in "thicknesses."

An employable lower limit for the average value of "sizes" involves 50 nm, 70 nm, or 100 nm; and an employable upper limit therefor involves 300 nm, or 250 nm. An employable lower limit for the average value of "thicknesses" involves 3.5 nm, 4.0 nm, or 4.2 nm; and an employable upper limit therefor involves 20 nm, or 15 nm. It is possible to employ each of the lower limits and upper limits presented for the averages values of "sizes" and "thicknesses" while combining them at one's discretion.

(Production Process for Particulate Material)
(First Stage)

A raw material comprising a Ti2-layered "MAX"-phase ceramic powder is subjected to an acidic treatment to partially dissolve the Al layers, thereby producing a Ti2-layered "MXene" particulate material. A particulate material suitable for the raw material involves those mainly composed of a composition that is expressed by at least one the formulas of $Ti_2AlC_{(1-x)}N_x$ (where "x" is 0<"x"<1) and $Ti_3Al(C_{(1-x)}N_x)_2$ (where "x" is 0<"x"<1).

In an X-ray diffraction Test, the Ti2-layered "MXene" particulate may preferably comprise $Ti_2AlC_{(1-x)}N_x$ (where 0<"x"<1) whose (002) plane exhibits a first peak intensity "A"; $Ti_3Al(C_{(1-x)}N_x)_2$ (where 0<"x"<1) whose (002) plane exhibits a second peak intensity "B" wherein a ratio of "B" to "A" ("B"/"A") is from 0.03 or more to 0.07 or less; and a crystal phase other than $Ti_2AlC_{(1-x)}N_x$ (where 0<"x"<1) and $Ti_3Al(C_{(1-x)}N_x)_2$ exhibiting a third peak intensity "C" wherein a ratio of "C" to "A" ("C"/"A") is 0.10 or less. A more preferable ratio "B"/"A" is from 0.03 or more to 0.05 or less, and a more preferable ratio "C"/"A" is 0.05 or less.

(Second Stage)

A production process for particulate material according to the present embodiment is a method suitable for producing the above-described particulate material. For the Ti2-layered "MAX"-phase ceramic powder, $Ti_2Al(C_{1-y}N_y)$ (where "y" is 0<"y"<1.0), namely, high-purity Ti2-layered "MAX"-phase ceramics, can be produced by the following steps, for instance: subjecting a mixed raw material of TiC, TiN, Al and Ti to a pressurizing treatment by cold isostatic pressing (or CIP) or uniaxial pressing in a range of from ton/$cm^2$ to 3 ton/$cm^2$; and subjecting the resultant powder-compact pulverized fragments to a heat treatment in an inert atmosphere whose temperature falls in a range of from 1,300° C. to 1,400° C. or less. For the Ti3-layered "MAX"-phase ceramic powder, $Ti_3Al(C_{1-x}N_x)_2$ (where "x" is 0<"x"<1.0), namely, high-purity Ti3-layered "MAX"-phase ceramics, can be produced by the following steps, for instance: subjecting a mixed raw material of TiC, TiN, Al and Ti to a pressurizing treatment by CIP or uniaxial pressing in a range of from 1 ton/cm² to 3 ton/cm²; or not subjecting the mixed raw material to the pressurizing treatment; and subjecting the resultant powder-compact pulverized fragments or the non-pressurized mixed raw material to a heat treatment in an inert atmosphere whose temperature falls in a range of from 1,450° C. to 1,600° C. or less.

One of the resulting ceramics is turned into a Ti2-layered or Ti3-layered "MXene" particulate material by subjecting the ceramic to an acidic treatment to partially dissolve the Al layers. Then, the resultant powdery "MXene" particulate material is optionally turned into a flaky Ti2-layered or Ti3-layered "MXene" particulate material by subjecting the particulate material to an exfoliation step of bead milling using beads with a diameter of from 10 μm to 300 μm.

An employable raw material to be supplied to the exfoliation step involves ceramics expressed by $Ti_2Al_x(C_{(1-y)}N_y)_z$ or $Ti_3Al_x(C_{1-y}N_y)_z$, namely, the same compositions as those of the present particulate materials to be produced eventually. Therefore, detailed descriptions on the values of "x," "y" and "z" for the ceramics will be omitted hereinafter, because those values described for the above-described present particulate materials are applicable to those for the ceramics as they are.

(i) Pretreatment Step

A raw material to be supplied to a pretreatment step can be produced by bring an acidic substance into contact with an "MAX"-phase ceramic powder at a controlled temperature of from 20° C. to 30° C., thereby removing some of Al elements included in the "MAX"-phase ceramic powder. A preferable raw material to be supplied to the pretreatment step comprises an "MAX" ceramic powder with a composition expressed by $Ti_2AlC_{(1-x)}N_x$ (where "x" is 0<"x"<1) for the Ti2 layers. A more preferable "MAX" ceramic powder to be used involves high-purity Ti2-layered "MAX"-phase ceramic powders comprising: $Ti_2AlC_{(1-x)}N_x$ (where 0<"x"<1) whose (002) plane exhibits a first peak intensity "A" in an X-ray diffraction test; $Ti_3Al(C_{(1-x)}N_x)_2$ (where 0<"x"<1) whose (002) plane exhibits a second peak intensity "B" wherein a ratio of "B" to "A" ("B"/"A") is from 0.03 or more to 0.07 or less; and a crystal phase other than $Ti_2AlC_{(1-x)}N_x$ (where 0<"x"<1) and $Ti_3Al(C_{(1-x)}N_x)_2$ (where 0<"x"<1) exhibiting a third peak intensity "C" wherein a ratio of "C" to "A" ("C"/"A") is 0.10 or less. A raw material to be supplied to the pretreatment step comprises an "MAX" ceramic powder with a composition expressed by $Ti_3Al(C_{(1-x)}N_x)_2$ (where 0<"x"<1) for the Ti3 layers.

Moreover, an amount of Al to be removed is adjusted to the extent that an amount of Al (equivalent to the value "x"), which remains in the "MAX"-phase ceramic powder produced by an acidic treatment with an acidic substance, is more than 0.02. Note that it is also possible to remove Al entirely. If such is the case, however, it is preferable not to develop the acidic treatment more than removing Al completely.

An amount of Al to be removed may be adjusted by changing the following: a time for which Al comes in contact with an acidic substance (e.g., an acidic aqueous solution, or the like) wherein the longer the time is the more the removed amount increases; a concentration of the acidic substance wherein the higher the concentration is the more the removed amount increases; an amount of the acidic substance where in the greater an absolute amount of the acidic substance is the greater the removed amount can be made; and a temperature at which Al is brought into contact with the acidic substance wherein the higher the temperature is the more the removed amount increases.

Subjecting an "MAX"-phase ceramic powder whose "A" element is Al, one of intercalation compounds, to an acidic treatment removes some of its Al, turns it into an intercalation compound with gap layers that constitutes the present particulate materials. A to-be-employed acid for removing some of Al layers in the ceramic powder involves an acidic substance in which hydrofluoric acid is combined with hydrochloric acid. In order to materialize a combination of hydrofluoric acid with hydrochloric acid, it is preferable to produce a mixture of hydrofluoric acid and hydrochloric acid by mixing a salt of hydrofluoric acid, such as KF or LiF, with hydrochloric acid.

In particular, a to-be-employed acidic substance involves aqueous solutions of the hydrofluoric acid and hydrochloric acid. A mixed concentration of the hydrofluoric acid and hydrochloric acid, which is formed when a fluoride salt is assumed to dissociate completely, is not at all restricted especially. A possible lower limit of a concentration of the hydrofluoric acid involves 1.7 mol/L, 2.0 mol/L, or 2.3 mol/L approximately; and a possible upper limit of the concentration involves 2.5 mol/L, 2.6 mol/L, or 2.7 mol/L approximately. A possible lower limit of a concentration of the hydrochloric acid involves 2.0 mol/L, 3.0 mol/L, or 4.0 mol/L approximately; and a possible upper limit of the concentration involves 13.0 mol/L, 14.0 mol/L, or 15.0 mol/L approximately.

A mixed ratio (or molar ratio) between the hydrofluoric acid and hydrochloric acid, which are formed when a fluoride salt is assumed to dissociate completely, is not at all restricted especially, either. However, an employable lower limit of the hydrofluoric acid involves 1:13, 1:12, or 1:11 by mole approximately; and an employable upper limit thereof involves 1:5, 1:6, or 1:7 by mole approximately. It is possible to employ each of the lower limits and upper limits presented herein while combining them at one's discretion. A preferable temperature of the acidic treatment is from 20° C. to 30° C., and a more preferable temperature thereof is from 20° C. to 25° C.

(ii) Exfoliation Step

So as to give the forms, which are described for the above-described present particulate materials, to the particulate materials that are produced to include many flaky particles after the exfoliation step, one of the following factors is adjusted as an example for the exfoliation step: a diameter of beads; a peripheral velocity; a feeding rate of slurry; a filled amount of beads; and a particulate concentration in slurry. The exfoliation step is a step of exfoliating layers in an intercalation compound, one of the raw materials. Using micro-size beads with 10 μm to 300 μm in diameter makes it possible to exfoliate flakes from the gap layers from which some of the Al layers are removed by the acidic treatment. Collision of the micro-size beads with interlayers in the intercalation compound allows exfoliating flakes in nanometer-level thicknesses.

An employable raw material to be supplied to the exfoliation step involves those with the same compositions as those of the materials that constitute the above-described present particulate materials. Generally, the exfoliation step does not change the composition largely.

The exfoliation is made possible by a bead mill equipped with a mechanism of classifying micro-fine beads from a slurry by centrifugal separation. For example, a possible lower limit of the sizes of beads is 10 µm, 15 µm, 20 µm, 30 µm, or 40 µm; and a possible upper limit thereof is 300 µm, 200 µm, or 100 µm. Using beads with 10 µm or more in size makes the classification of the beads from a slurry easy. Using beads with 300 µm or less permits the exfoliation to develop more preferentially than making the present particulate materials smaller in size. It is possible to employ each of the lower limits and upper limits while combining them at one's discretion. Moreover, it is most preferable to employ beads with from 50 µm to 100 µm in size, because beads with sizes falling in a proper range allow an energy to be given to the present particulate materials to enlarge and permit the exfoliation to develop preferentially.

Although the beads are not at all restricted in material quality, it is possible to employ ceramics, such as zirconia, alumina and silicon nitride, for the beads. In particular, partially-stabilized zirconia is a preferable option because of the large fracture toughness. Meanwhile, note that making sizes of the present particulate materials smaller is developed more preferentially than the exfoliation by a commonly-used bead mill in which beads with more than 300 µm in size are used to classify the beads from a slurry in micro-size clearances or interspaces. Moreover, making sizes of the present particulate materials smaller is also developed more preferentially than the exfoliation with a ball mill, such as a planetary ball mill, in which beads or balls with more than 300 µm in size are used.

An employable peripheral velocity at the exfoliation step is from six m/sec to 12 m/sec. A preferable peripheral velocity is from eight m/sec to 10 m/sec. A peripheral velocity of six m/sec or more offers a good exfoliation efficiency, whereas a peripheral velocity of 12 m/sec or less inhibits the development of oxidation in the surface of the resulting present particulate materials and allows making electric resistance low, because it inhibits the impartation of excessive energy, and because it permits inhibiting the temperature of the resultant present particulate materials from increasing. An employable feed rate of slurry is from 100 mL/min to 300 mL/min. An employable particulate concentration in slurry is from one mg/mL to five mg/mL.

The exfoliation step is preferably carried out under the condition that a particulate concentration in slurry is five mg/mL or less, because the particulate concentration allows the exfoliation to develop fully and lowers the necessity of classification by centrifugal separation, or the like, for the selection of flaky particulate materials. Moreover, the particulate concentration in slurry being five mg/L or less enables the resulting slurry to keep diameters of submerged particles low. In addition, setting a particulate concentration in slurry to one mg/mL or more makes the efficiency of exfoliation better.

A preferable temperature of slurry falls in a range of 35° C. or less. Setting the temperature to 35° C. or less allows inhibiting the present particulate materials from being oxidized in the surface, and permits them to keep the electric resistance low.

An employable amount of filled beads is from 40% to 80% by volume. Setting the filling amount to 40% by volume or more makes the efficiency of exfoliation better; whereas setting it to 80% by volume or less makes the classification of beads from a slurry easier. An observation with a scanning electron microscope (or SEM) or transmission electron microscope (or TEM) allows judging whether or not a particulate material including many targeted flaky particulates is produced. In particular, doing an analysis with an atomic force microscope (or AFM) permits judging the present particulate materials for thickness. It is also possible to utilize a particulate material obtained by the exfoliation step after subjecting it to such a classification method as centrifugal separation, if needed. Optimum conditions at the exfoliation step are not all restricted to the above-described numerical values, because they vary depending on the size of apparatuses.

According to the results of X-ray diffraction (or XRD) analysis of $Ti_2AlC$, an "MAX"-phase ceramic (or $Ti_2AlC$) powder had an interplanar spacing of 0.68 nm between the (002) planes; whereas the post-acidic treatment particulate material and post-exfoliation particulate material had a broadened interplanar spacing of 1.26 nm between the (002) planes. This signifies that an interlayer distance was 0.58 nm between the gap layers formed by dissolving some of the Al layers. The results of XRD analysis will be hereinafter described while exemplifying $Ti_2AlC_{0.5}N_{0.5}$, for instance, in which nitrogen substituted some of the carbon sites in a Ti2-layered "MAX"-phase ceramic powder: an "MAX"-phase ceramic (or $Ti_2C_{0.5}N_{0.5}$) powder had an interplanar spacing of 0.68 nm between the (002) planes; whereas the particulate material and flaky particulate material, which underwent the acidic treatment and exfoliation according to the present invention respectively, had a broadened interplanar spacing of 1.37 nm between the (002) planes. The broadened interplanar spacing signifies that an interlayer distance was 0.69 nm between the gap layers formed by dissolving some of the Al layers, namely, substituting nitrogen for some of the Al layers further broadened the interlayer distance between the gap layers. Meanwhile, according to the results of XRD analysis of $Ti_3AlC_2$, an "MAX"-phase ceramic (or $Ti_3AlC_2$) powder had an interplanar spacing of 0.93 nm between the (002) planes; whereas the post-acidic treatment particulate material and post-exfoliation particulate material had a broadened interplanar spacing of 1.36 nm between the (002) planes. This signifies that an interlayer distance was 0.43 nm between the gap layers formed by dissolving some of the Al layers. The results of XRD analysis will be hereinafter described while exemplifying $Ti_3Al(C_{0.5}N_{0.5})_2$, for instance, in which nitrogen substituted some of the carbon sites in a Ti3-layered "MAX"-phase ceramic powder: an "MAX"-phase ceramic (or $Ti_e(C_{0.5}N_{0.5})_2$) powder had an interplanar spacing of 0.92 nm between the (002) planes; whereas the particulate material and flaky particulate material, which underwent the acidic treatment and exfoliation according to the present invention respectively, had a broadened interplanar spacing of 1.46 nm between the (002) planes. This signifies that an interlayer distance was 0.54 nm between the gap layers formed by dissolving some of the Al layers. Subtracting an interplanar spacing between the (002) planes in an "MAX"-phase ceramic powder from an interplanar spacing between the (002) planes in a post-exfoliation particulate material allows the computation of an interlayer distance between the gap layers.

The gap layers are good in affinity with lithium ions and sodium ions, because they have adhered functional groups, such as an OH group and halogen groups, in the surface. The lithium ions and sodium ions are readily stored in and eliminated from the gap layers. Consequently, the particulate materials according to the present embodiment are effective as a negative-electrode active material for secondary battery. The further broadened interlayer distance enables ions having such a large ionic diameter as that of sodium ions to be stored and eliminated with ease. Note that using a conventional exfoliation technique, like ultrasonic irradiation, or wet-type jet mill or roller mill, has made it difficult to fully exfoliate the present particulate materials.

Secondary Battery

A secondary battery according to the present embodiment comprises one of the above-described present particulate materials as a negative-electrode active material. An exemplifiable present secondary battery involves lithium-ion secondary batteries, and sodium-ion secondary batteries. Constituents of the present secondary battery other than the negative-electrode active material are not at all restricted especially. Note that, in making use of the present particulate materials for a negative-electrode active material for secondary battery, the Ti2-system "MXene" particulate material is more suitable than the Ti3-system particulate material in terms of battery capacities.

EXAMPLES

Making of "MXene" Particulate Material

First Example

The respective powders of three-μm TiC produced by RARE METALLIC, three-μm TiN produced by RARE METALLIC, 35-μm Ti produced by KOJUNDO CHEMICAL LABORATORY, and 30-μm Al produced by KOJUNDO CHEMICAL LABORATORY were mixed into a mixed powder whose TiC:TiN:Ti:Al ratio equaled 0.5:0.5:1:1 by mole. The resulting mixed powder was subjected to one-ton/cm$^2$ cold isostatic pressing (or CIP). Then, the resultant powder-compact pulverized fragments were subjected to a solid-phase reaction at 1,350° C. in an argon gas flow with a small-size vacuum-pressurizing sintering furnace, thereby making "MAX"-phase ceramics whose composition was $Ti_2AlC_{0.5}N_{0.5}$.

Figure 3:
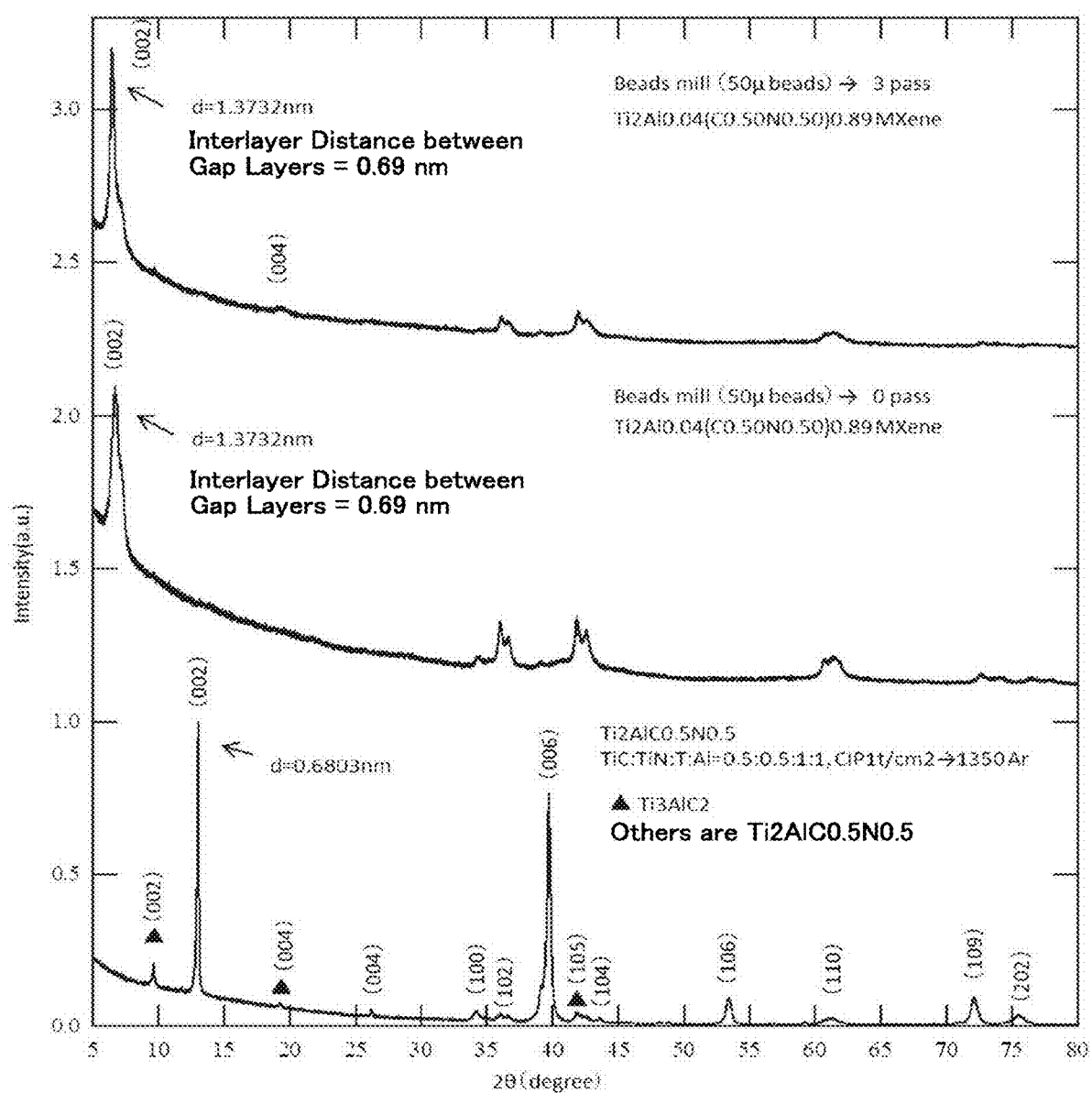
FIG. 3 is an XRD profile showing the results of measuring the particulate material according to First Example for X-ray diffraction intensity.

The resulting "MAX"-phase ceramics were pounded or grounded in an alumina mortar, were thereafter pulverized in isopropyl alcohol (or IPA) with a ball mill using zirconia balls with 5 mm in diameter for 24 hours, and were then further pulverized with a planetary ball mill using zirconia balls with 0.5 mm in diameter for 45 minutes. The resultant pulverized product was subjected to a removal of the IPA using an evaporator under the conditions of 60° C. in a vacuum, and was thereafter subjected to an XRD analysis with a horizontally-held-sample type multipurpose X-ray diffractometer (e.g., "Ultima IV" produced by RIGAKU). The XRD test was carried out under the following conditions: the use of a holder made of silica glass; 40 kV/40 mA; eight-degree/min scanning speed; 0.01-degree sampling step; and from 5 to 80-degree 2θ. FIG. 3 illustrates the resulting XRD profile. Moreover, Table 1 shows a ratio of the Ti3 crystal phase, an impurity, to the Ti2 crystal phase, and another ratio of an unreacted substance and intermediate product, such as remained $Ti_3AlC_{0.5}N_{0.5}$ and $TiC_{0.5}N_{0.5}$, to the Ti2 crystal phase.

A pretreatment step was carried out in the following manner: five grams of the thus produced $Ti_2AlC_{0.5}N_{0.5}$ powder was charged slowly into a 300-mL mixed aqueous solution that contained 4.5-g LiF in GM HCl and was cooled with ice in a polytetrafluoroethylene crucible; and the $Ti_2AlC_{0.5}N_{0.5}$ powder was left in the mixed aqueous solution, whose temperature was controlled in a range of from 20° C. to 30° C., while stirring the mixed aqueous solution for 18 hours.

After water washing the dispersed $Ti_2AlC_{0.5}N_{0.5}$ powder 10 times by centrifugal separation and removing a supernatant liquid repeatedly three times by centrifugal separation, ethanol was substituted for the solvent in the resulting dispersion liquid. The resultant ethanol slurry was dried at room temperature to carry out an XRD analysis. FIG. 3 illustrates an XRD profile of the thus produced $Ti_2AlC_{0.5}N_{0.5}$ powder. Moreover, the ethanol slurry was diluted to a particulate concentration of two mg/mL, and was then subjected to bead milling using beads having 50 μm in diameter. Note that the conditions of the bead milling were as follows: the use of beads made of "YTZ balls" produced by NIKKATO; three-round passing; 10 m/sec peripheral velocity; 150 mL/min liquid feeding rate; and 60%-by-volume filled beads rate.

10 milliliters of the ethanol slurry of the exfoliated flaky particulate material was dropped on an wafer made of silicon by a spin coater (e.g., "MS-B100" produced by MIKASA) operated at 600 rpm. The produced particulate material was measured for size (i.e., an average value of the "longer sides" and "shorter sides") by observation with an SEM, and was measured for thickness by analysis with an AFM. For each of the measurements, 100 isolated particles were selected to compute the average size and thickness. Table 2 shows the thus obtained results. FIG. 1 illustrates an SEM photograph showing the state of exfoliated particles. The SEM photograph was taken using a scanning electron microscope (e.g., "SU8020" produced by HITACHI SEISAKUSHO). The AFM used for measuring the thicknesses was "Nano Scope/Dimension Icon," an atomic force microscope produced by BULKER AX Corporation, which was operated in the tapping measurement mode for 512×512 measurement points.

The ethanol slurry of the produced particulate material was dried at room temperature. The resulting room-temperature dried powder was used to measure for Ti, Al, C and N contents by chemical analysis, and was further analyzed by XRD.

In the chemical analysis, the atomic percentages of Ti, Al, C and N were used to compute the contents of Al, C and N when the content of Ti was taken as two. Table 2 shows the obtained results. The chemical analysis was carried out in the following manner: weighing out a sample in a predetermined amount in a platinum plate; adding a mixed solvent of nitric acid, sulfuric acid and hydrofluoric acid to the sample; dissolving the sample into the mixed solvent by heating the platinum plate at 120° C. approximately and thereafter evaporating off the nitric acid and hydrofluoric acid by further heating it at a high temperature of 300° C. approximately, thereby making a sample solution of sulfuric acid; and subjecting the thus made sample solution to a quantitative analysis by inductively-coupled plasma (or ICP) after diluting it appropriately. Moreover, the sample solution was further subjected to an XRD analysis. FIG. 3 illustrates the resulting XRD profile. Table 2 shows the resultant interlayer distance between the gap layers formed by dissolving some of Al.

Second Example

Except for using a mixed powder whose TiC:TiN:Ti:Al ratio equaled 0.9:0.1:1:1 by mole as a starting raw material, a particulate material according to Second Example was prepared in the same manner as First Example was prepared.

Table 2 shows the interlayer distance between the formed gap layers, and the thickness, size and composition of flakes.

Third Example

Except for using a mixed powder whose TiC:TiN:Ti:Al ratio equaled 0.75:0.25:1:1 by mole as a starting raw material, a particulate material according to Third Example was prepared in the same manner as First Example was prepared. Table 2 shows the interlayer distance between the formed gap layers, and the thickness, size and composition of flakes.

Fourth Example

Except for using a mixed powder whose TiC:TiN:Ti:Al ratio equaled 0.25:0.75:1:1 by mole as a starting raw material, a particulate material according to Fourth Example was prepared in the same manner as First Example was prepared. Table 2 shows the interlayer distance between the formed gap layers, and the thickness, size and composition of flakes.

Fifth Example

Except for using a mixed powder whose TiC:TiN:Ti:Al ratio equaled 0.1:0.9:1:1 by mole as a starting raw material, a particulate material according to Fifth Example was prepared in the same manner as First Example was prepared. Table 2 shows the interlayer distance between the formed gap layers, and the thickness, size and composition of flakes.

Sixth Example

Figure 6:
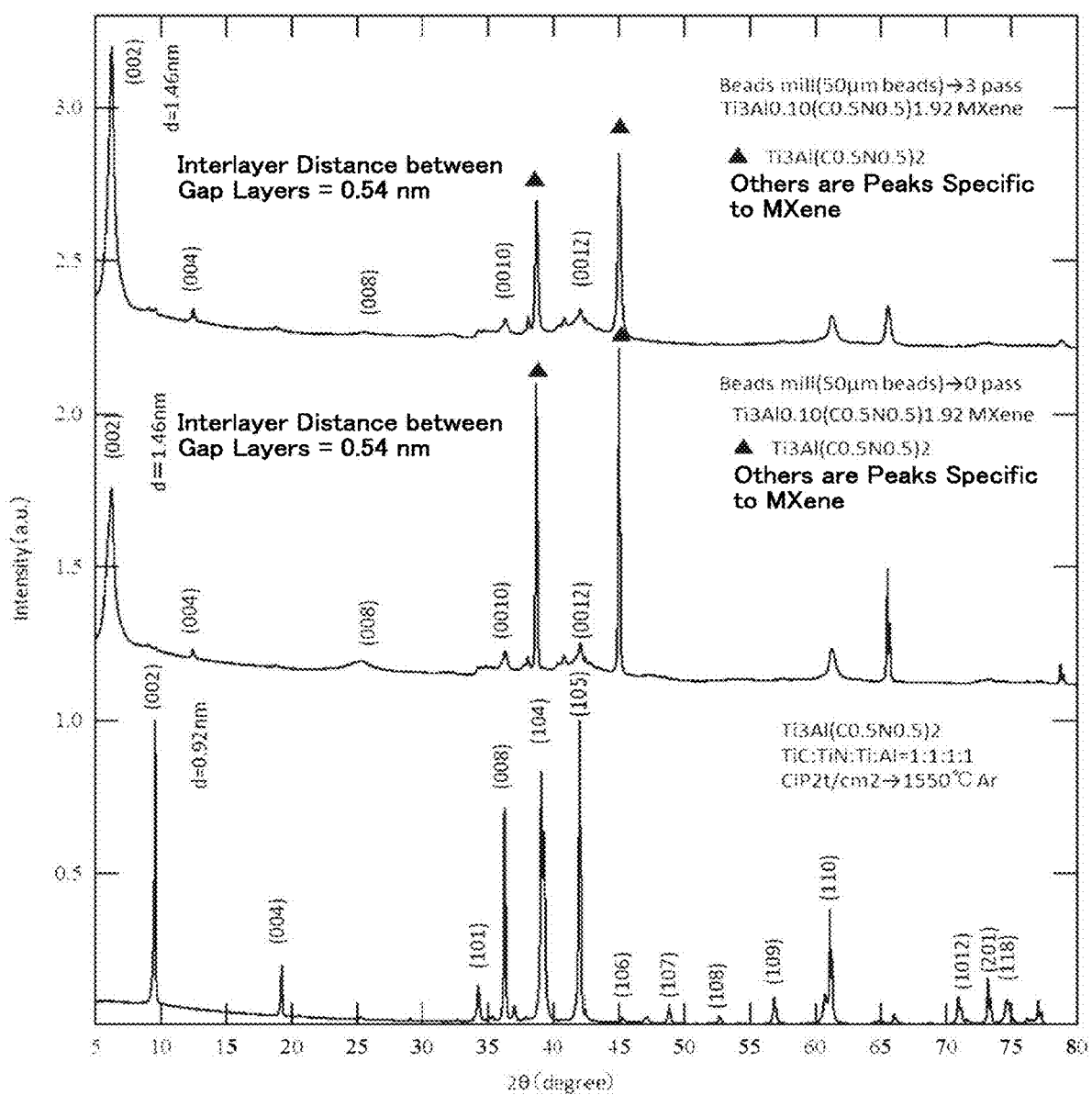
FIG. 6 is an XRD profile showing the results of measuring the particulate material according to Sixth Example for X-ray diffraction intensity.

The respective powders of three-$\mu m$ TiC produced by RARE METALLIC, three-$\mu m$ TiN produced by RARE METALLIC, 35-$\mu m$ Ti produced by KOJUNDO CHEMICAL LABORATORY, and 30-$\mu m$ Al produced by KOJUNDO CHEMICAL LABORATORY were mixed into a mixed powder whose TiC:TiN:Ti:Al ratio equaled 1:1:1:1 by mole. The resulting mixed powder was subjected to two-ton/cm$^2$ cold isostatic pressing (or CIP). Then, the resultant powder-compact pulverized fragments were subjected to a solid-phase reaction at 1,550° C. in an argon gas flow, thereby making "MAX"-phase ceramics. The resulting "MAX"-phase ceramics were pounded or grounded in an alumina mortar, were thereafter pulverized in IPA with a ball mill using zirconia balls with 5 mm in diameter for 24 hours, and were then further pulverized with a planetary ball mill using zirconia balls with 0.5 mm in diameter for 45 minutes. The resultant pulverized product was subject to a removal of the IPA using an evaporator under the conditions of 60° C. in a vacuum, and was thereafter subjected to an XRD analysis. Thus, the pulverized product was confirmed to have a single phase made of $Ti_3Al(C_{0.5}N_{0.5})_2$. FIG. 6 illustrates the result. Then, a pretreatment step was carried out in the following manner: 10 grams of the thus produced $Ti_3Al(C_{0.5}N_{0.5})_2$ powder was charged slowly into a 300-mL mixed aqueous solution that contained 18.0-g LiF in 12M HCl and was cooled with ice in a polytetrafluoroethylene crucible; and the $Ti_3Al(C_{0.5}N_{0.5})_2$ powder was left in the mixed aqueous solution whose temperature was controlled in a range of from 20° C. to 30° C. while stirring the mixed aqueous solution for 24 hours.

After water washing the dispersed $Ti_3Al(C_{0.5}N_{0.5})_2$ powder 10 times by centrifugal separation and removing a supernatant liquid repeatedly three times by centrifugal separation, ethanol was substituted for the solvent in the resulting dispersion liquid. The resultant ethanol slurry was dried at room temperature to carry out an XRD analysis. FIG. 6 illustrates the results of the XRD analysis. Moreover, the ethanol slurry was diluted to a particulate concentration of two mg/mL, and was then subjected to bead milling using beads having 50 $\mu m$ in diameter. Note that the conditions of the bead milling were as follows: the use of beads made of "YTZ balls" produced by NIKKATO; three-round passing; 10 m/sec peripheral velocity; 150 mL/min liquid feeding rate; and 60%-by-volume filled beads rate.

10 milliliters of the ethanol slurry of the exfoliated flaky particulate material was dropped on a wafer made of silicon by a spin coater (e.g., "MS-B100" produced by MIKASA) operated at 600 rpm. The produced particulate material was measured for the size (i.e., an average value of the "longer sides" and "shorter sides") by observation with an SEM, and was measured for the thickness by analysis with an AFM. For each of the measurements, 100 isolated particles were selected to compute the average size and thickness. Table 3 shows the thus obtained results. The AFM used for measuring thicknesses was "Nano Scope/Dimension Icon," an atomic force microscope produced by BULKER AX Corporation, which was operated in the tapping measurement mode for 512×512 measurement points.

The ethanol slurry of the produced particulate material was dried at room temperature. The resulting room-temperature dried powder was used to measure for the Ti, Al, C and N contents by chemical analysis, and was further analyzed by XRD. FIG. 6 illustrates the results.

In the chemical analysis, the atomic percentages of Ti, Al, C and N were used to compute the contents of Al, C and N when the content of Ti was taken as three. Table shows the obtained results. The chemical analysis was carried out in the following manner: weighing out a sample in a predetermined amount in a platinum plate; adding a mixture of nitric acid, sulfuric acid and hydrofluoric acid to the sample; dissolving the sample into the mixed solvent by heating the platinum plate at 120° C. approximately and thereafter evaporating off the nitric acid and hydrofluoric acid by further heating it at a higher temperature of 300° C. approximately, thereby making a sample solution of sulfuric acid; and subjecting the thus made sample solution to a quantitative analysis by inductively-coupled plasma (or ICP) after diluting it appropriately.

Seventh Example

Except for using a mixed powder whose TiC:TiN:Ti:Al ratio equaled 1.8:0.2:1:1 by mole as a starting raw material, a particulate material according to Seventh Example was prepared in the same manner as Sixth Example was prepared. Table 3 shows the interlayer distance between the formed gap layers, and the thickness, size and composition of flakes.

Eighth Example

Except for using a mixed powder whose TiC:TiN:Ti:Al ratio equaled 1.5:0.5:1:1 by mole as a starting raw material, a particulate material according to Eighth Example was prepared in the same manner as Sixth Example was prepared. Table 3 shows the interlayer distance between the formed gap layers, and the thickness, size and composition of flakes.

Ninth Example

Except for using a mixed powder whose TiC:TiN:Ti:Al ratio equaled 0.5:1.5:1:1 by mole as a starting raw material, a particulate material according to Ninth Example was prepared in the same manner as Sixth Example was prepared. Table 3 shows the interlayer distance between the formed gap layers, and the thickness, size and composition of flakes.

Tenth Example

Except for using a mixed powder whose TiC:TiN:Ti:Al ratio equaled 0.2:1.8:1:1 by mole as a starting raw material, a particulate material according to Tenth Example was prepared in the same manner as Sixth Example was prepared. Table 3 shows the interlayer distance between the formed gap layers, and the thickness, size and composition of flakes.

First Comparative Example

Figure 2:
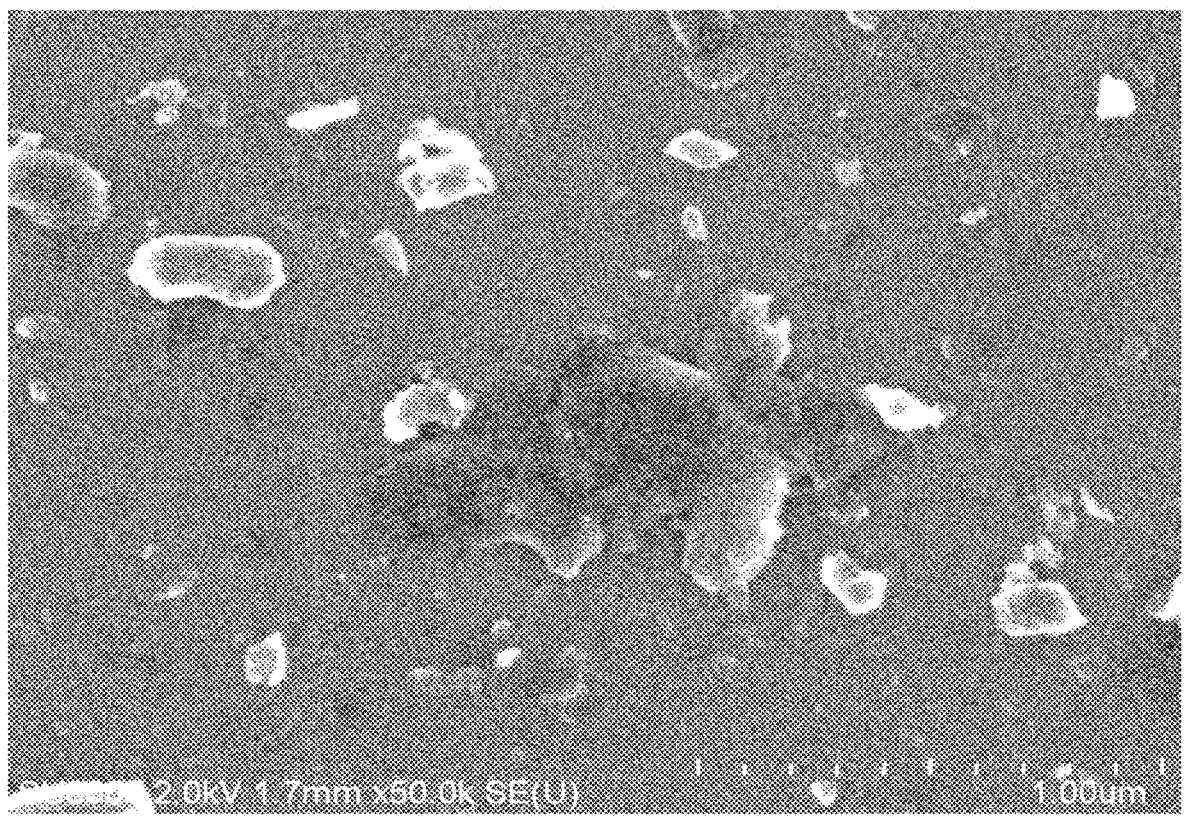
FIG. 2 is an SEM image showing how a particulate material according to First Comparative Example was exfoliated.
Figure 4:
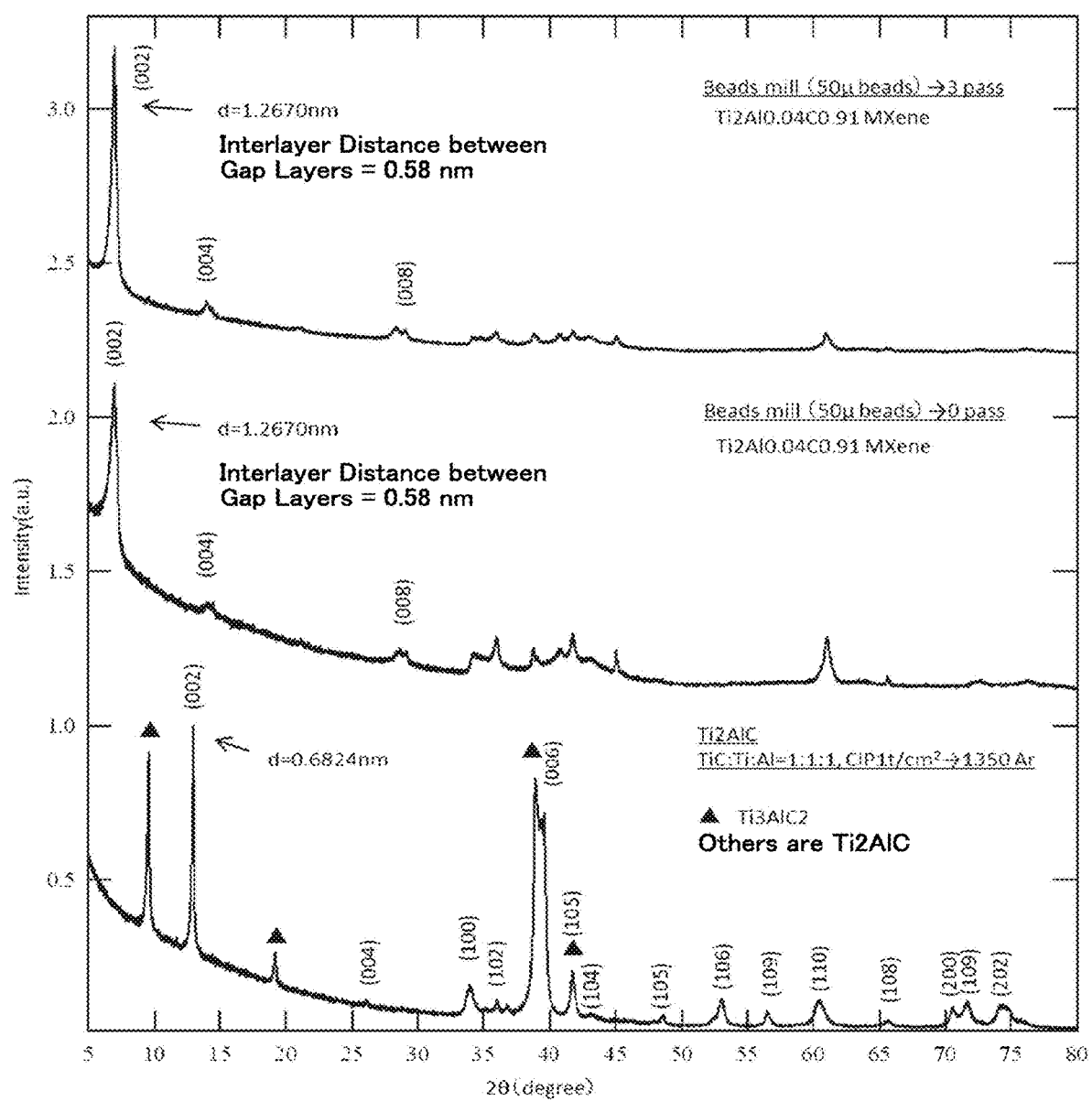
FIG. 4 is an XRD profile showing the results of measuring the particulate material according to First Comparative Example for X-ray diffraction intensity.

Except for using a mixed powder whose TiC:TiN:Ti:Al ratio equaled 1:0.0:1:1 by mole as a starting raw material, a particulate material according to First Comparative Example was prepared in the same manner as First Example was prepared. FIG. 2 shows an SEM image showing the state of exfoliated particles. FIG. 4 illustrates an XRD profile of produced Ti2-layered "MAX"-phase ceramics and Ti2-layered "MXene" particulate material. Moreover, Table 2 shows the interlayer distance between the formed gap layers, and the thickness, size and composition of flakes.

Second Comparative Example

Figure 7:
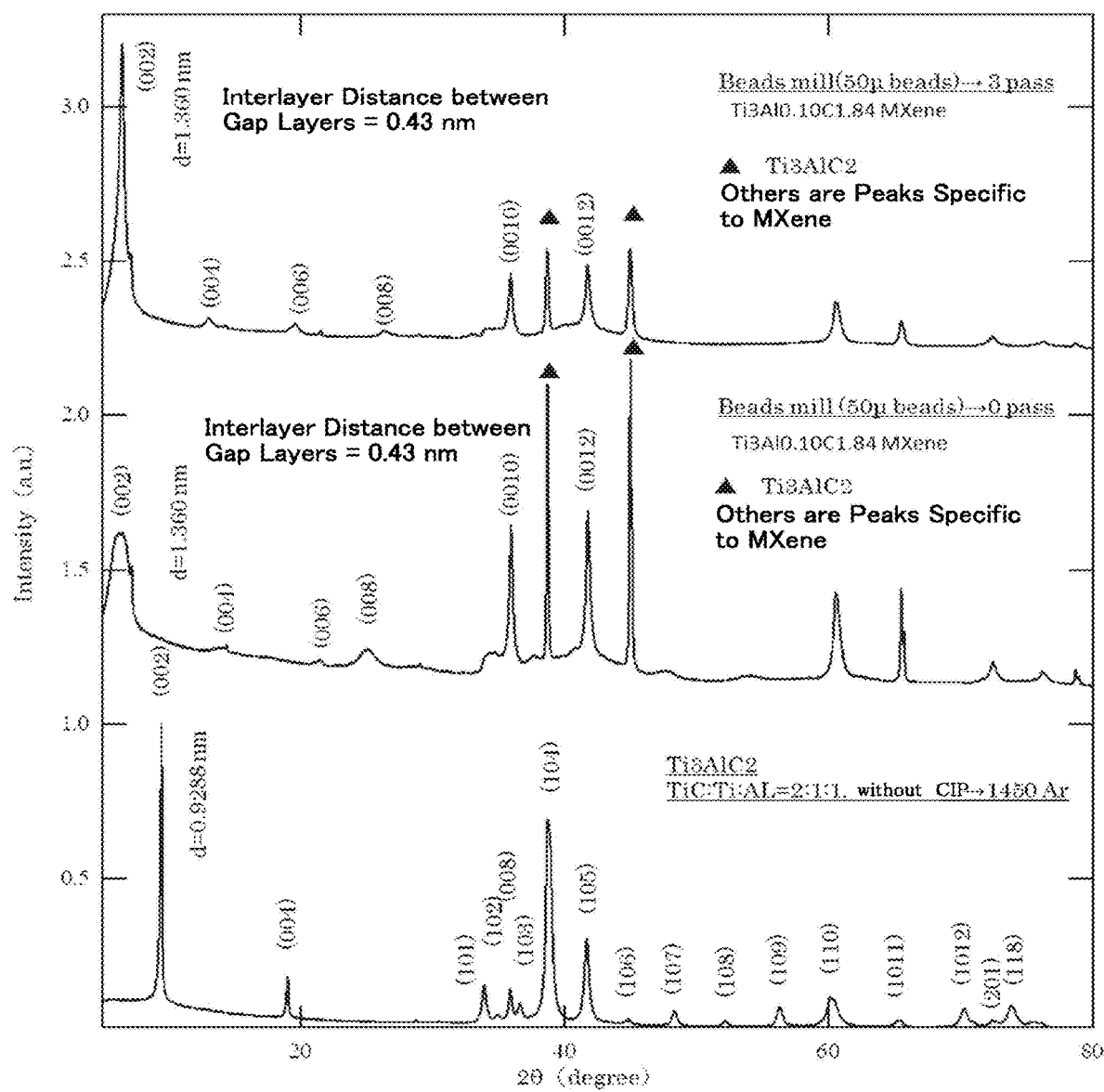
FIG. 7 is an XRD profile showing the results of measuring a particulate material according to Second Comparative Example for X-ray diffraction intensity.

Except for using a mixed powder whose TiC:TiN:Ti:Al ratio equaled 2:0.0:1:1 by mole as a starting raw material, a particulate material according to Second Comparative Example was prepared in the same manner as Sixth Example was prepared. FIG. 7 illustrates an XRD profile of produced Ti3-layered "MAX"-phase ceramics and Ti3-layered "MXene" particulate material. Moreover, Table 3 shows the interlayer distance between the formed gap layers, and the thickness, size and composition of flakes.

Making of "MAX"-phase Ceramic Particulate Material

Eleventh Example

Figure 5:
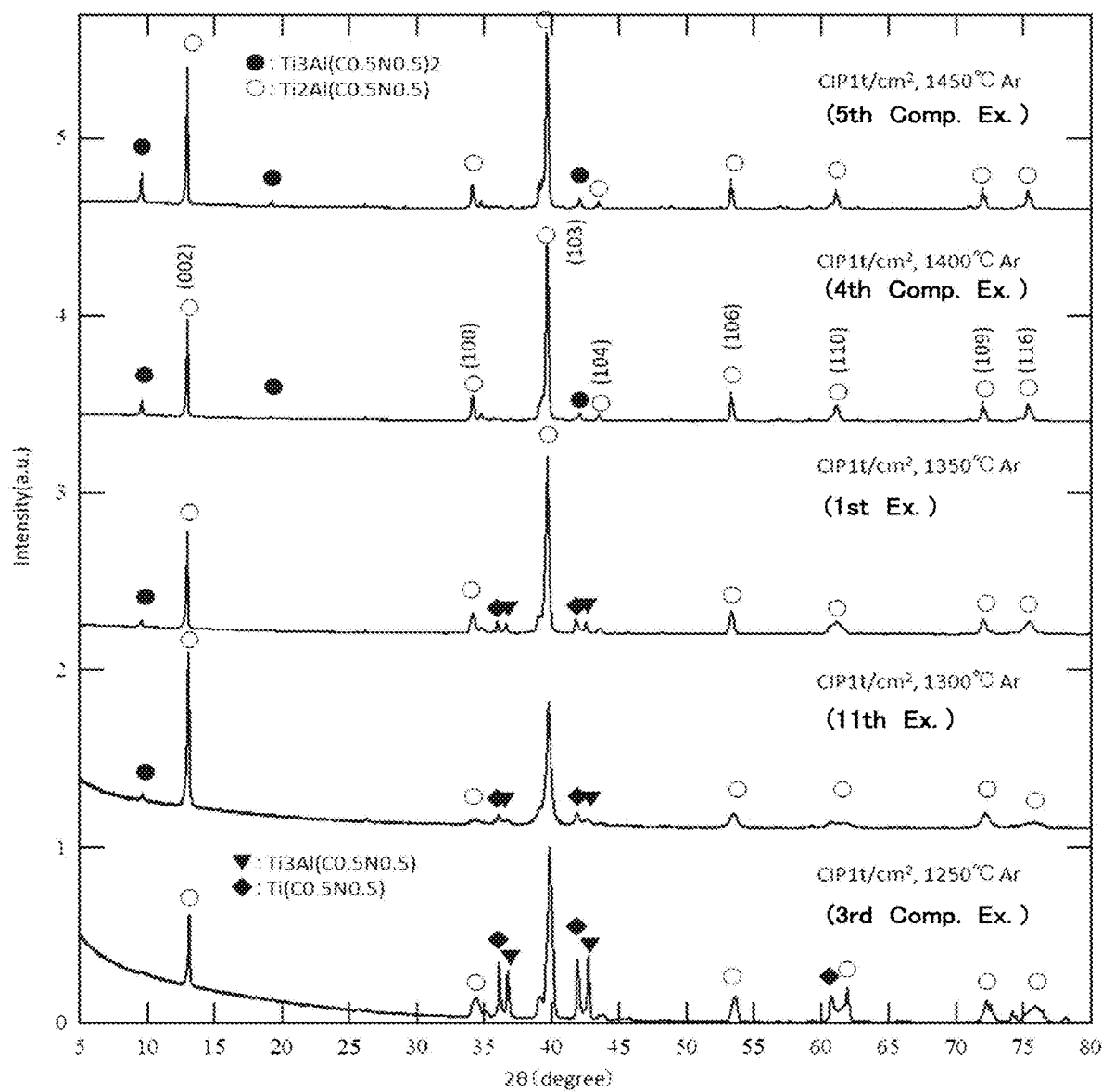
FIG. 5 is an XRD profile showing the results of measuring "MAX"-phase ceramic particulate materials according to Third Comparative Example, Sixth Example, First Example, Fourth Comparative Example and Fifth Comparative Example for X-ray diffraction intensity.

Except for setting the calcination temperature at 1,300° C., an "MAX"-phase ceramic particulate material according to Eleventh Example was prepared in the same manner as First Example was prepared. The resulting particulate material was analyzed by XRD in the same manner as First Example was analyzed. Table 1 shows the results. FIG. 5 illustrates the resultant XRD profile.

Third Comparative Example

Except for setting the calcination temperature at 1,250° C., an "MAX"-phase ceramic particulate material according to Third Comparative Example was prepared in the same manner as First Example was prepared. The resulting particulate material was analyzed by XRD in the same manner as First Example was analyzed. Table 1 shows the results. FIG. 5 illustrates the resultant XRD profile.

Fourth Comparative Example

Except for setting the calcination temperature at 1,400° C., an "MAX"-phase ceramic particulate material according to Fourth Comparative Example was prepared in the same manner as First Example was prepared. The resulting particulate material was analyzed by XRD in the same manner as First Example was analyzed. Table 1 shows the results. FIG. 5 illustrates the resultant XRD profile.

Fifth Comparative Example

Except for setting the calcination temperature at 1,450° C., an "MAX"-phase ceramic particulate material according to Fifth Comparative Example was prepared in the same manner as First Example was prepared. The resulting particulate material was analyzed by XRD in the same manner as First Example was analyzed. Table 1 shows the results. FIG. 5 illustrates the resultant XRD profile.

TABLE 1

|  |  | Ti3 - Phase (9 deg.) to Ti2-Phase (13 deg.) | Ti3AlC0.5N0.5-Phase (36 deg.) to Ti2-Phase (13 deg.) | TiC0.5N0.5-Phase (37 deg.) to Ti2-Phase (13 deg.) |
|---|---|---|---|---|
| 3rd Comp. Ex. | By 1-ton/cm² CIP At 1,250° C. In Ar | 0.01 | 0.53 | 0.47 |
| 6th Ex. | By 1-ton/cm² CIP At 1,300° C. In Ar | 0.04 | 0.04 | 0.02 |
| 1st Ex. | By 1-ton/cm² CIP At 1,350° C. In Ar | 0.06 | 0.06 | 0.06 |
| 4th Comp. Ex. | By 1-ton/cm² CIP At 1,400° C. In Ar | 0.19 | 0.00 | 0.00 |
| 5th Comp. Ex. | By 1-ton/cm² CIP At 1,450° C. In Ar | 0.22 | 0.00 | 0.00 |

TABLE 2

| | "MAX"-phase | Pressure and Temperature | "MXene" Interlayer Distance (nm) | Form Thickness (nm) | Size (nm) | Composition |
|---|---|---|---|---|---|---|
| 1st Comp. Ex. | $Ti_2AlC$ | By 1-ton/cm² CIP At 1,350° C. | 0.58 | 4.3 | 100 | $Ti_2Al_{0.04}C_{0.91}$ |
| 2nd Ex. | $Ti_2AlC_{0.9}N_{0.1}$ | By 1-ton/cm² CIP At 1,350° C. | 0.60 | 5.1 | 120 | $Ti_2Al_{0.04}(C_{0.90}N_{0.10})_{0.89}$ |
| 3rd Ex. | $Ti_2AlC_{0.75}N_{0.25}$ | By 1-ton/cm² CIP At 1,350° C. | 0.63 | 4.5 | 100 | $Ti_2Al_{0.04}(C_{0.75}N_{0.25})_{0.89}$ |
| 1st Ex. | $Ti_2AlC_{0.9}N_{0.5}$ | By 1-ton/cm² CIP At 1,350° C. | 0.69 | 5.0 | 110 | $Ti_2Al_{0.04}(C_{0.50}N_{0.50})_{0.89}$ |
| 4th Ex. | $Ti_2AlC_{0.25}N_{0.75}$ | By 1-ton/cm² CIP At 1,350° C. | 0.62 | 5.2 | 120 | $Ti_2Al_{0.04}(C_{0.25}N_{0.75})_{0.89}$ |
| 5th Ex. | $Ti_2AlC_{0.1}N_{0.9}$ | By 1-ton/cm² CIP At 1,350° C. | 0.59 | 5.2 | 110 | $Ti_2Al_{0.04}(C_{0.10}N_{0.90})_{0.89}$ |

TABLE 3

| | "MAX"-phase | Pressure and Temperature | "MXene" Interlayer Distance (nm) | Form Thickness (nm) | Size (nm) | Composition |
|---|---|---|---|---|---|---|
| 2nd Comp. Ex. | $Ti_3AlC_2$ | Without CIP At 1,450 °C. | 0.43 | 5.1 | 120 | $Ti_3Al_{0.10}C_{1.84}$ |
| 7th Ex. | $Ti_3Al(C_{0.9}N_{0.1})_2$ | By 2-ton/cm² CIP At 1,550 °C. | 0.46 | 6.3 | 120 | $Ti_3Al_{0.10}(C_{0.90}N_{0.10})_{1.78}$ |
| 8th Ex. | $Ti_3Al(C_{0.75}N_{0.25})_2$ | By 2-ton/cm² CIP At 1,550 °C. | 0.51 | 4.5 | 100 | $Ti_3Al_{0.10}(C_{0.75}N_{0.25})_{1.80}$ |
| 6th Ex. | $Ti_3Al(C_{0.9}N_{0.5})_2$ | By 2-ton/cm² CIP At 1,550 °C. | 0.54 | 9.8 | 120 | $Ti_3Al_{0.10}(C_{0.30}N_{0.50})_{1.92}$ |
| 9th Ex. | $Ti_3Al(C_{0.25}N_{0.75})_2$ | By 2-ton/cm² CIP At 1,550 °C. | 0.52 | 5.2 | 120 | $Ti_3Al_{0.10}(C_{0.25}N_{0.75})_{1.78}$ |
| 10th Ex. | $Ti_3Al(C_{0.1}N_{0.9})_2$ | By 2-ton/cm² CIP At 1,550 °C. | 0.42 | 5.2 | 110 | $Ti_3Al_{0.10}(C_{0.10}N_{0.90})_{1.73}$ |

Results and Considerations (1) On Method of Making Ti2-Layered "MAX"-Phase Ceramics (a) A reaction mechanism of Ti2-layered "MAX"-phase ceramics will be hereinafter explained while exemplifying $Ti_2AlC$, a representative example of the Ti2-layered "MAX"-phase ceramics. Using TiC, Ti and Al powders as starting raw materials, and then calcining the resultant mixed raw material at a temperature of 1,250° C. or more in an inert atmosphere allow the production of $Ti_2AlC$. At 1,300° C. or less, $Ti_3Al$ and TiC, namely, intermediate products, remain. However, at 1,300° C., most of $Ti_2AlC$ decompose to form $Ti_3AlC_2$. In order to produce $Ti_2AlC$ that is of high purity, a method has been available conventionally in which a powder compact is made by subjecting the mixed raw material to a CIP treatment or uniaxial pressing in a pressure range of from one ton/cm² to three ton/cm² and thereafter pulverized fragments of the powder compact are subjected to a heat treatment in an inert atmosphere. However, the conventional method has not been effective, and has not been permitting the production of $Ti_2AlC$ that is of high purity. Moreover, increasing the amounts of the Ti and Al powders, for instance, to 1.2 times as much as the theoretical amounts, the resulting Ti2-layered "MAX"-phase ceramics were highly purified more than those made of the theoretical amounts of the Ti and Al powders, but did not lead to the production of $Ti_2AlC$ that was highly purified fully.

It was found that using TiC, TiN, Ti and Al powders as starting raw materials, and calcining the resultant mixed raw material at a temperature of from 1,300° C. or more to 1,400° C. or less in an inert atmosphere allow the production of high-purity $Ti_2Al(C_{1-x}N_x)$ (where 0<"x"<1). Moreover, making a powder compact by subjecting the mixed raw material to a CIP treatment or uniaxial pressing in a pressure range of from one ton/cm² to three ton/cm² and thereafter subjecting pulverized fragments of the powder compact to a heat treatment in an inert atmosphere led to the production of Ti2-layered "MAX"-phase ceramics that were of much higher purity.

In a temperature range of from 1,200° C. to 1,300° C., such a reaction mechanism as $Ti_3Al(C_{1-x}N_x)+TiAl(C_{1-x}N_x) \rightarrow 2Ti_2Al(C_{1-x}N_x)$ produced high-purity Ti2-layered "MAX"-phase ceramics. At a temperature of higher than 1,400° C., $Ti_2Al(C_{1-x}N_x)$ decomposed to form $Ti_3Al(C_{1-x}N_x)_2$. Moreover, $Ti_2AlC_{0.5}N_{0.5}$, namely, a composition in which nitrogen substitutes half of the carbon sites, produced highest-purity Ti2-layered "MAX"-phase ceramics.

(b) Regarding Ti3-layered "MAX"-phase ceramics, making a powder compact by subjecting the mixed raw material to a CIP treatment in a pressure range of from one ton/cm² to three ton/cm², and then calcining pulverized fragments of the powder compact at a temperature of from 1,500° C. to 1,550° C. in an inert atmosphere resulted in producing $Ti_3Al(C_{0.5}N_{0.5})_2$, for instance. The calcination temperature set at 1,500° C. or more allowed inhibiting unreacted substances from remaining. Moreover, the calcination temperature set at 1,550° C. or less permitted collecting Ti3-layered "MAX"-phase ceramics without decomposing them.

(2) On Making Ti2-Layered "MXene" Particulate Material

Al was removed completely from a ceramic powder by a conventional technique where the ceramic powder was immersed in a 10%-or-more HF aqueous controlled solution in a aqueous-solution temperature range of from 20° C. to 30° C. for 24 hours or more at the pretreatment step of carrying out an acidic treatment. Moreover, Al was also removed completely from a ceramic powder by another conventional technique where the ceramic powder was even immersed in an (LiF+HCl) or (KF+HCl) aqueous solution at a temperature of from 35° C. to 45° C. for 24 hours or more. Both of the conventional techniques increased products in the electric resistance, because the acidic-treatment processes developed partial superficial oxidation in the products.

In contrast, under the conditions of immersing a ceramic powder in an (LiF+HCl) or (KF+HCl) aqueous solution at a temperature of from 20° C. to 30° C., obtained flaky particulate materials had remaining Al but exhibited a small electric resistance, because the superficial oxidation developed more moderately at the pretreatment step than at those according to the conventional techniques. Therefore, it was found to be preferable to employ a condition under which Al is not completely removed but remains, because the condition allows the produced flaky particulate materials to exhibit a lowered electric resistance.

Moreover, the interlayer distance between formed gap layers was further broadened by carrying out the dissolution of Al by an acidic treatment with use of an "MAX"-phase ceramic powder in which nitrogen substituted for some of the carbon sites in $Ti_2AlC$ or $Ti_3AlC_2$. The interlayer distance between the gap layers broadened most in an "MXene" particulate material derived from $Ti_2AlC_{0.5}N_{0.5}$ or $Ti_3Al(C_{0.5}N_{0.4})_2$ in which the nitrogen substituted for the carbon sites in the half amount. Although no reason has been clarified yet definitely, the broadened interlayer distance can be explained by weakened bonding forces via functional groups between layers, resulting in enlarging interatomic distances.

(3) On Technique of Exfoliating Particulate Material

As a method of exfoliating particulate materials, it has been conventional to use methods by ultrasonic irradiation or rollers. According to investigations carried out by the present inventors for the exfoliation method by ultrasonic irradiation, it was found difficult to produce flaky particulate materials by exfoliation. In addition to the fact that the ultrasonic irradiation offered an extremely slow rate of exfoliating particulate materials at the interlayers, the ultrasonic irradiation did not at all exfoliate the particulate materials in some cases. Moreover, the method by rollers did not fully develop the exfoliation of particulate materials.

In addition, it was difficult even for a method by wet jet milling to exfoliate particulate materials. Meanwhile, it was found that subjecting particulate materials to bead milling using beads whose bead diameter is from 10 μm to 300 μm not only allows flaky fragments to be produced quickly in a uniform state; but also permits the produced flaky fragments to exhibit an average value of sizes obtained by an SEM image, namely, [{(longer sides)+(shorter sides)}/2], average value which is from 50 nm or more to 300 nm or less, and to exhibit an average value of thicknesses obtained by AFM analysis, average value which is from 3.5 nm or more to 20 nm or less.

In particular, adjusting the concentration of particles at from one to five mg/mL in a slurry and then carrying out the exfoliation step in an organic solvent allowed the preparation of a slurry whose particles were from 50 nm or more to 500 nm or less in agglomerated D50 diameter by volume percentage when measured in the organic solvent, and in which the particles were highly dispersed. In contrast to the above, carrying out bead milling using beads whose bead diameter was 500 μm developed the pulverization of particulate materials so that the particulate materials were hardly exfoliated.

What is claimed is:

1. A particulate material with a composition expressed by $Ti_2Al_x(C_{(1-y)}N_y)_z$ where "x" is more than 0.02, "y" is 0<"y"<1.0, and "z" is from 0.8 to 1.20, the particulate material comprising layers including gap layers providing an interlayer distance of from 0.59 nm to 0.70 nm within a crystal lattice.

2. A particulate material with a composition expressed by $Ti_3Al_x(C_{(1-y)}N_y)_z$ where "x" is more than 0.02, "y" is 0<"y"<1.0, and "z" is from 1.80 to 2.60, the particulate material comprising layers including gap layers providing an interlayer distance of from 0.44 nm to 0.55 nm within a crystal lattice.

3. The particulate material according to claim 1, having thicknesses whose average value is from 3.5 nm or more to 20 nm or less, and sizes, [{(longer sides)+(shorter sides)}/2], whose average value is from 50 nm or more to 300 nm or less.

4. A particulate material whose major component has a composition expressed by $Ti_2AlC_{(1-x)}N_x$ where 0<"x"<1, wherein, based on a first peak intensity "A" of a (002) plane in $Ti_2Al(C_{(1-x)}N_x)$ where 0<"x"<1 exhibited in an X-ray diffraction test,
   a (002) plane in $Ti_3Al(C_{(1-x)}N_x)_2$ where 0<"x"<1 exhibits a second peak intensity "B" such that a ratio of the second peak intensity "B" to the first peak intensity "A" ("B"/"A") is from 0.03 or more to 0.07 or less, and
   a crystal phase other than $Ti_2AlC_{(1-x)}N_x$ where 0<"x"<1 and $Ti_3Al(C_{(1-x)}N_x)_2$ where 0<"x"<1 exhibits a third peak intensity "C" such that a ratio of the third peak intensity "C" to the first peak intensity "A" ("C"/"A") is 0.10 or less.

5. A process for producing the particulate material of claim 1, comprising:

a pretreatment step of removing some of contained aluminum (Al) elements from a particulate material by reacting the particulate material with an acidic substance, which is composed of a combination of a fluoride salt and hydrochloric acid, at an aqueous-solution temperature of from 20° C. to 30° C., thereby producing a raw material; and a production step of producing the particulate material from the raw material, wherein the particulate material reacted with the acidic substance is a particulate material whose major component has a composition expressed by $Ti_2AlC_{(1-x)}N_x$ where $0<\text{"}x\text{"}<1$, wherein, based on a first peak intensity "A" of a (002) plane in $Ti_2Al(C_{(1-x)}N_x)$ where $0<\text{"}x\text{"}<1$ exhibits in an X-ray diffraction test, a (002) plane in $Ti_3Al(C_{(1-x)}N_x)_2$ where $0<\text{"}x\text{"}<1$ exhibits a second peak intensity "B" such that a ratio of the second peak intensity "B" to the first peak intensity "A" ("B"/"A") is from 0.03 or more to 0.07 or less, and a crystal phase other than $Ti_2AlC_{(1-x)}N_x$ where $0<\text{"}x\text{"}<1$ and $Ti_3Al(C_{(1-x)}N_x)_2$ where $0<\text{"}x\text{"}<1$ exhibits a third peak intensity "C" such that a ratio of the third peak intensity "C" to the first peak intensity "A" ("C"/"A") is 0.10 or less.

6. A process for producing the particulate material of claim 1, comprising:

a pretreatment step of removing some of contained aluminum (Al) elements from an "MAX"-phase ceramic powder by reacting the "MAX"-phase ceramic powder with an acidic substance, which is composed of a combination of a fluoride salt and hydrochloric acid, at an aqueous-solution temperature of from 20° C. to 30° C., thereby producing a raw material; and a production step of producing the particulate material.

7. A secondary battery, comprising:
a negative-electrode active material including the particulate material according to claim 1.

8. The particulate material according to claim 2, having thicknesses whose average value is from 3.5 nm or more to 20 nm or less, and sizes, [{(longer sides)+(shorter sides)}/2], whose average value is from 50 nm or more to 300 nm or less.

9. A process for producing the particulate material of claim 3, comprising:

a pretreatment step of removing some of contained aluminum (Al) elements from a particulate material by reacting the particulate material with an acidic substance, which is composed of a combination of a fluoride salt and hydrochloric acid, at an aqueous-solution temperature of from 20° C. to 30° C., thereby producing a raw material; and a production step of producing the particulate material from the raw material, wherein the particulate material reacted with the acidic substance is a particulate material whose major component has a composition expressed by $Ti_2AlC_{(1-x)}N_x$ where $0<\text{"}x\text{"}<1$, wherein, based on a first peak intensity "A" of a (002) plane in $Ti_2Al(C_{(1-x)}N_x)$ where $0<\text{"}x\text{"}<1$ exhibits in an X-ray diffraction test, a (002) plane in $Ti_3Al(C_{(1-x)}N_x)_2$ where $0<\text{"}x\text{"}<1$ exhibits a second peak intensity "B" such that a ratio of the second peak intensity "B" to the first peak intensity "A" ("B"/"A") is from 0.03 or more to 0.07 or less, and a crystal phase other than $Ti_2AlC_{(1-x)}N_x$ where $0<\text{"}x\text{"}<1$ and $Ti_3Al(C_{(1-x)}N_x)_2$ where $0<\text{"}x\text{"}<1$ exhibits a third peak intensity "C" such that a ratio of the third peak intensity "C" to the first peak intensity "A" ("C"/"A") is 0.10 or less.

10. A secondary battery, comprising:
a negative-electrode active material including the particulate material according to claim 2.

11. A secondary battery, comprising:
a negative-electrode active material including the particulate material according to claim 3.

12. A process for producing the particulate material of claim 2, comprising:

a pretreatment step of removing some of contained aluminum (Al) elements from an "MAX"-phase ceramic powder by reacting the "MAX"-phase ceramic powder with an aqueous solution of an acidic substance, which is composed of a combination of a fluoride salt and hydrochloric acid, at an aqueous-solution temperature of from 20° C. to 30° C., thereby producing a raw material; and a production step of producing the particulate material.

13. The process according to claim 12, wherein the "MAX"-phase ceramic powder has a composition expressed by $Ti_3Al(C_{(1-x)}N_x)_2$.

* * * * *